(12) United States Patent
Tamura et al.

(10) Patent No.: US 11,316,184 B2
(45) Date of Patent: Apr. 26, 2022

(54) FUEL CELL SYSTEM

(71) Applicant: Panasonic Intellectual Property Management Co., Ltd., Osaka (JP)

(72) Inventors: Satoru Tamura, Chiba (JP); Takao Hayashi, Osaka (JP); Marine Fayolle, Osaka (JP); Yosuke Kitazawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 118 days.

(21) Appl. No.: 16/426,617

(22) Filed: May 30, 2019

(65) Prior Publication Data

US 2019/0379077 A1 Dec. 12, 2019

(30) Foreign Application Priority Data

Jun. 12, 2018 (JP) .............................. JP2018-111809

(51) Int. Cl.
| | |
|---|---|
| *H01M 8/18* | (2006.01) |
| *H01M 8/04014* | (2016.01) |
| *H01M 8/0612* | (2016.01) |
| *H01M 8/1018* | (2016.01) |
| *H01M 8/10* | (2016.01) |

(52) U.S. Cl.
CPC ......... *H01M 8/18* (2013.01); *H01M 8/04022* (2013.01); *H01M 8/0618* (2013.01); *H01M 2008/1095* (2013.01)

(58) Field of Classification Search
CPC .. H01M 8/18; H01M 8/04022; H01M 8/0618; H01M 8/04014; Y02E 60/50
See application file for complete search history.

(56) References Cited

U.S. PATENT DOCUMENTS

| | | | | |
|---|---|---|---|---|
| 2007/0292729 | A1* | 12/2007 | Brantley ................ | B01J 8/0492 |
| | | | | 429/423 |
| 2008/0187789 | A1* | 8/2008 | Ghezel-Ayagh ........................... | |
| | | | | H01M 8/04014 |
| | | | | 429/414 |
| 2011/0014532 | A1 | 1/2011 | Knuckey et al. | |
| 2017/0141425 | A1* | 5/2017 | Katayama ............. | H01M 8/188 |
| 2019/0379068 | A1* | 12/2019 | Tamura ................... | H01M 8/18 |

FOREIGN PATENT DOCUMENTS

JP 2011-510466 3/2011

* cited by examiner

*Primary Examiner* — Anca Eoff
(74) *Attorney, Agent, or Firm* — McDerott Will & Emery LLP

(57) ABSTRACT

A fuel cell system includes: a fuel cell that includes a cathode and an anode and generates electricity by reducing a mediator at the cathode; a regenerator that oxidizes, with an oxidant, the mediator reduced by the cathode; an oxidant feed path that is connected to the regenerator, wherein through the oxidant feed path, the oxidant to be supplied to the regenerator flows; a reformer; a combustor that heats the reformer; and a first heat exchanger that exchanges heat between combustion exhaust discharged from the combustor and the oxidant to be supplied to the regenerator.

7 Claims, 5 Drawing Sheets

FUEL CELL SYSTEM

CROSS-REFERENCE TO RELATED APPLICATIONS

The instant application claims priority from the Japanese patent application JP 2018-111809 filed on Jun. 12, 2018.

BACKGROUND

1. Technical Field

The present disclosure relates to a fuel cell system.

2. Description of the Related Art

In a fuel cell in the related art, hydrogen is oxidized at the anode, and oxygen is reduced at the cathode. The cathodic reduction of oxygen proceeds slowly, and primarily because of this, fuel cells are not very efficient in terms of reaction rates. To address this drawback, redox-flow fuel cells are under development.

A redox-flow fuel cell is a fuel cell that includes a mediator for promoting at least one of the cathodic and anodic reactions. In an exemplary configuration of a redox-flow fuel cell, hydrogen gas is supplied to the anode, and a mediator solution is supplied to the cathode.

A system built with a redox-flow fuel cell usually has a regenerator for regenerating the mediator (Japanese Patent No. 5683963). The system regenerates the mediator at the regenerator and supplies the regenerated mediator to the cathode again so that the reactions in the fuel cell can occur repeatedly. For example, at the regenerator, chemical reaction between the reduced form of the mediator and oxygen is promoted through exposure of a mediator solution to air. In this way, the mediator is regenerated into its oxidized form.

SUMMARY

To improve the efficiency of a fuel cell system, it is important to accelerate the regeneration of the mediator at the regenerator.

One non-limiting and exemplary embodiment provides techniques for faster regeneration of a mediator.

In one general aspect, the techniques disclosed here feature a fuel cell system. The fuel cell system includes: a fuel cell that includes a cathode and an anode and generates electricity by reducing a mediator at the cathode; a regenerator that oxidizes, with an oxidant, the mediator reduced by the cathode; an oxidant feed path that is connected to the regenerator, wherein through the oxidant feed path, the oxidant to be supplied to the regenerator flows; a reformer; a combustor that heats the reformer; and a first heat exchanger that exchanges heat between combustion exhaust discharged from the combustor and the oxidant to be supplied to the regenerator.

The techniques according to the present disclosure enable faster regeneration of a mediator.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
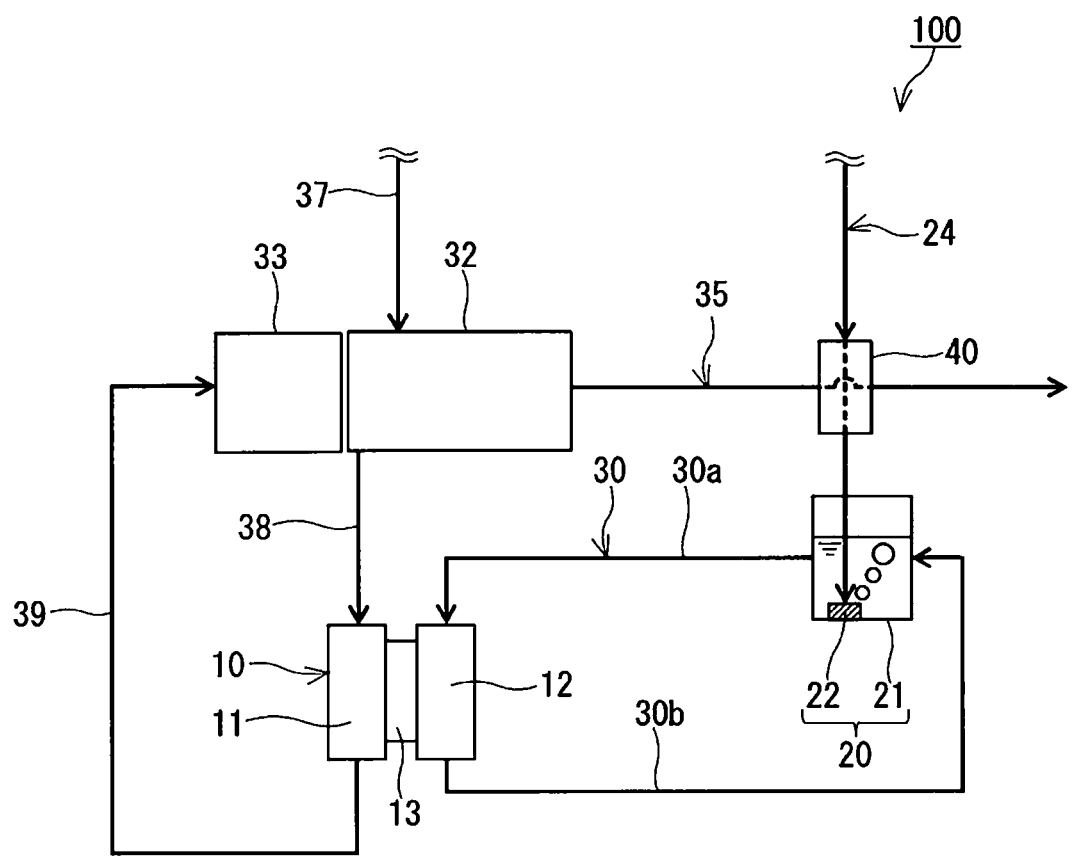
FIG. 1 illustrates the construction of a fuel cell system according to Embodiment 1 of the present disclosure.

Underlying Knowledge Forming Basis of the Present Disclosure

The inventors noticed that the oxidant itself is a cause of slow regeneration of the mediator. Driven by this notion, the inventors completed the fuel cell system according to the present disclosure. Introducing a cold oxidant into the regenerator causes the mediator solution to be cooled by the oxidant. A lowered temperature of the mediator solution leads to slower reoxidation of the mediator. The reduced form of the mediator is therefore concentrated, eventually affecting the output power of the fuel cell.

The oxidant is usually external air, and the temperature of external air varies with the environment where the system operates. Introducing external air as the oxidant into the regenerator, particularly in cold latitudes, therefore tends to cause the mediator solution to cool down.

Overview of Aspects of the Disclosure

A fuel cell system includes: a fuel cell that includes a cathode and an anode and generates electricity by reducing a mediator at the cathode; a regenerator that oxidizes, with an oxidant, the mediator reduced by the cathode; an oxidant feed path that is connected to the regenerator, wherein through the oxidant feed path, the oxidant to be supplied to the regenerator flows; a reformer; a combustor that heats the reformer; and a first heat exchanger that exchanges heat between combustion exhaust discharged from the combustor and the oxidant to be supplied to the regenerator.

In the first aspect, the cooling down of the mediator solution in the regenerator is limited because the oxidant has been heated when it is introduced into the regenerator. As a result, the regeneration of the mediator at the regenerator is accelerated.

In a second aspect of the present disclosure, for example, the fuel cell system according to the first aspect may further include a second heat exchanger besides the first heat exchanger. Whereas the first heat exchanger exchanges heat between combustion exhaust and the oxidant to be supplied to the regenerator, the second heat exchanger exchanges heat between gas discharged from the regenerator and the oxidant to be supplied to the regenerator. In the second aspect, the mediator solution in the regenerator is maintained at a higher temperature, making the regeneration of the mediator at the regenerator faster.

In a third aspect of the present disclosure, for example, the second heat exchanger in the fuel cell system according to the second aspect may be upstream of the first heat exchanger in the oxidant feed path. In the third aspect, the oxidant is supplied at a higher temperature to the regenerator.

In a fourth aspect of the present disclosure, for example, the fuel cell system according to the second or third aspect may further include a third heat exchanger that exchanges heat between anode off-gas discharged from the anode and the oxidant to be supplied to the regenerator. In the fourth aspect, the mediator solution in the regenerator is maintained at a higher temperature, making the regeneration of the mediator at the regenerator faster.

In a fifth aspect of the present disclosure, for example, the second heat exchanger in the fuel cell system according to the fourth aspect may be upstream of the first heat exchanger in the oxidant feed path, and the third heat exchanger may be upstream of the second heat exchanger in the oxidant feed path. In the fifth aspect, the oxidant is supplied at a higher temperature to the regenerator.

In a sixth aspect of the present disclosure, for example, the second heat exchanger in the fuel cell system according to the fourth aspect may be upstream of the first heat exchanger in the oxidant feed path, and the third heat exchanger may be between the first and second heat exchangers in the oxidant feed path. In the sixth aspect, the oxidant is supplied at a higher temperature to the regenerator.

In a seventh aspect of the present disclosure, for example, the fuel cell system according to the first aspect may further include a second heat exchanger that exchanges heat between gas discharged from the regenerator and the oxidant to be supplied to the regenerator, and a third heat exchanger that exchanges heat between anode off-gas discharged from the anode and the oxidant to be supplied to the regenerator. In the seventh aspect, the mediator solution in the regenerator is maintained at a higher temperature, making the regeneration of the mediator at the regenerator faster.

In an eighth aspect of the present disclosure, for example, the third heat exchanger in the fuel cell system according to the seventh aspect may be upstream of the second heat exchanger in the oxidant feed path. In the eighth aspect, the oxidant is supplied at a higher temperature to the regenerator.

In a ninth aspect of the present disclosure, for example, the fuel cell system according to any one of the first to eighth aspects may further include a circulation path that connects the fuel cell and the regenerator in such a manner that a solution containing the mediator circulates between the cathode of the fuel cell and the regenerator. In the ninth aspect, the cathodic reaction proceeds smoothly.

The following describes embodiments of the present disclosure with reference to drawings. The present disclosure is not limited to these embodiments.

Embodiment 1

FIG. 1 illustrates the construction of a fuel cell system according to Embodiment 1 of the present disclosure. The fuel cell system 100 includes a fuel cell 10 and a regenerator 20. The fuel cell 10 is a redox-flow fuel cell. The regenerator 20 is connected to the fuel cell 10 in such a manner that a mediator solution can circulate between the fuel cell 10 and the regenerator 20.

The fuel cell system 100 has several advantages, including reduced consumption of a costly noble-metal catalyst, highly efficient power generation owing to a smaller overvoltage, and a simpler cooling system by virtue of the use of a mediator solution.

The fuel cell 10 has an anode 11 (fuel electrode), a cathode 12 (oxidant electrode), and an electrolyte membrane 13. The electrolyte membrane 13 is between the anode 11 and the cathode 12. The anode 11, cathode 12, and electrolyte membrane 13 form a membrane electrode assembly. The fuel cell 10 may be a single cell or may be formed by a stack of multiple cells. The fuel cell 10 generates electricity by oxidizing fuel gas at the anode 11 and reducing a mediator at the cathode 12. The use of a mediator is not limited to the cathode 12; the reaction at the anode 11 may likewise involve a mediator.

The anode 11 is a porous electrode. The electrode is made of an electrically conductive material, such as a carbon material. Examples of carbon materials include glassy carbon, carbon nanotubes, and carbon felt. If the fuel gas is oxidized directly on the anode 11, the electrically conductive material carries, for example, a catalyst, such as platinum, thereon. If the reaction at the anode 11 involves a mediator, the catalyst can be omitted.

The cathode 12 is, for example, a porous substrate. A porous substrate that can be used as the anode 11 can also be used as the cathode 12. Since the fuel cell 10 performs the reaction at its cathode 12 using a mediator, the cathode 12 requires no catalyst, such as platinum. The cathode 12, however, may have a catalyst.

The electrolyte membrane 13 is a membrane that conducts protons. The material for the electrolyte membrane 13 is not critical. To name a few, the electrolyte membrane 13 can be a fluoropolymer or hydrocarbon-polymer electrolyte membrane. An exemplary fluoropolymer electrolyte membrane is one made from a perfluorosulfonic acid polymer, such as Nafion® (DuPont). An exemplary hydrocarbon-polymer electrolyte membrane is one made with a hydrocarbon polymer that has protonic acid groups (groups that conduct protons) introduced thereto. The hydrocarbon polymer can be, for example, an engineering or general-purpose plastic. Examples of engineering plastics include polyether ether ketone, polyether ketone, polyether sulfone, polyphenylene sulfide, polyphenylene ether, and polyparaphenylene. Examples of general-purpose plastics include polyethylene, polypropylene, and polystyrene. The protonic acid groups can be, for example, sulfonic acid, carboxylic acid, phosphoric acid, or boronic acid groups.

The regenerator 20 is, for example, a container 21. The regenerator 20 oxidizes the mediator. The container 21 has an inner space in which the mediator solution can be retained. The container 21 may be thermally insulating.

The regenerator 20 may include a bubbler 22. The bubbler 22 helps an oxidant come into contact with the mediator solution by producing tiny bubbles of the oxidant. The bubbler 22 is inside the container 21. In this embodiment, the bubbler 22 is on the bottom of the container 21. To the bubbler 22, an oxidant is supplied from the outside. The oxidant is blown out of the bubbler 22 and rises in the mediator solution while touching it. As a result, the mediator is oxidized. In this embodiment, the oxidant is a gas. Typically, the oxidant is atmospheric oxygen (oxygen gas).

The mediator solution contains a mediator and a solvent. Any kind of mediator can be used. To name a few, the mediator can be a polyoxometalate (POM), metal ions, or a metal complex. Polyoxometalates that can be used include phosphomolybdic acid, phosphovanadic acid, and phosphotungstic acid, and metals polyoxometalates can have include vanadium, molybdenum, and tungsten. Examples of metal complexes include porphyrin metal complexes, TEMPO (2,2,6,6-tetramethylpiperidine 1-oxyl)-coordinated metal complexes, and metal complexes coordinated by an oxidase or its derivative. The oxidase can be, to name a few, galactose oxidase, bilirubin oxidase, or glucose oxidase. The mediator solution may contain multiple mediators. The solvent, too, can be of any kind. To name a few, the solvent can be water, aqueous sulfuric acid, or aqueous phosphoric acid. The pH of the solution may be acidic. The mediator solution may contain an appropriate electrolyte.

The concentration of the mediator in the mediator solution has been adjusted to an appropriate level so that the reaction at the cathode 12 will proceed smoothly. The concentration of the mediator can be adjusted in accordance with the kind of mediator. If the mediator solution is an aqueous solution of the POM, the concentration of the POM in the aqueous solution is, for example, 0.05 mol/liter or more or may even be 0.1 mol/liter or more.

The fuel cell system 100 further includes an oxidant feed path 24. The oxidant feed path 24 is connected to the regenerator 20. To be more specific, the oxidant feed path 24 is connected to the bubbler 22 of the regenerator 20. Through the oxidant feed path 24, an oxidant for oxidizing the mediator at the regenerator 20 flows. The oxidant feed path 24 may be equipped with a fan, blower, or any other oxidant feeder so that the oxidant can be blown into the mediator solution.

The fuel cell system 100 further includes a circulation path 30. The circulation path 30 connects the fuel cell 10 and the regenerator 20. Through the circulation path 30, the mediator solution can circulate between the cathode 12 of the fuel cell 10 and the regenerator 20. To be more specific, the circulation path 30 allows the mediator reduced at the cathode 12 to be oxidized at the regenerator 20 and supplied to the cathode 12 again. This ensures the reaction at the cathode 12 proceeds smoothly.

In this embodiment, the circulation path 30 has a first path 30a and a second path 30b. The first path 30a connects the solution outlet of the regenerator 20 and the entry to the cathode 12. The second path 30b connects the exit from the cathode 12 and the solution inlet of the regenerator 20. The circulation path 30 may be equipped with a pump. The pump may be in the first path 30a or may be in the second path 30b. There may even be a pump in the first path 30a and another in the second path 30b.

Each of the first and second paths 30a and 30b of the circulation path 30 can be at least one pipe. There may be components other than a pump along the circulation path 30, such as connectors, filters, valves, flowmeters, and sensors. These also apply to other paths.

The fuel cell system 100 further includes a reformer 32. The reformer 32 produces, for example, a hydrogen-containing gas through a reforming reaction, such as steam reforming ($CH_4+H_2O \rightarrow 3H_2+CO$). The reformer 32 contains a reforming catalyst, a catalyst for promoting the reforming reaction. The reformer 32 may contain a catalyst for removing carbon monoxide (catalyst for converting or selectively oxidizing CO). The reformer 32 produces a hydrogen-containing gas from steam and raw-material gas. The raw-material gas is, for example, a hydrocarbon gas, such as town gas or liquefied petroleum (LP) gas. The hydrogen-containing gas is supplied to the fuel cell 10 as fuel gas.

The fuel cell system 100 further includes a combustor 33 and a gas exhaust path 35. The combustor 33 heats the reformer 32 by burning an inflammable gas. The combustor 33 is adjacent to the reformer 32. The combustor 33 may alternatively be inside the reformer 32. The gas exhaust path 35 is connected to the combustor 33. Through the gas exhaust path 35, the combustion exhaust produced at the combustor 33 flows. The gas exhaust path 35 extends, for example, to the outside of the enclosure of the fuel cell system 100.

The fuel cell system 100 further includes a raw-material gas feed path 37, a fuel gas feed path 38, and an anode gas discharge path 39. Through the raw-material gas feed path 37, raw-material gas is supplied from a storage tank, town-gas infrastructure, or any other source of the raw material (not illustrated) to the reformer 32. Through the fuel gas feed path 38, a hydrogen-containing gas is supplied from the reformer 32 to the fuel cell 10. The fuel gas feed path 38 connects the reformer 32 and the fuel cell 10. Through the anode gas discharge path 39, unreacted residue of the hydrogen-containing gas is discharged from the anode 11 of the fuel cell 10. The anode gas discharge path 39 connects the anode gas outlet of the fuel cell 10 and the combustor 33. The unreacted hydrogen-containing gas is supplied to the combustor 33 through the anode gas discharge path 39. The combustor 33 heats the reformer 32 by burning the hydrogen-containing gas.

The fuel cell system 100 further includes a heat exchanger 40 (first heat exchanger). The heat exchanger 40 exchanges heat between the combustion exhaust discharged from the combustor 33 and the oxidant to be supplied to the regenerator 20. The oxidant to be supplied to the regenerator 20 is heated by the combustion exhaust. The heat exchanger 40 is in the oxidant feed path 24. To be more specific, the heat exchanger 40 is in the oxidant feed path 24 and the gas exhaust path 35. The heat exchanger 40 forms part of the oxidant feed path 24, and also forms part of the gas exhaust path 35.

The heat exchanger 40 transfers the heat of the hot combustion exhaust discharged from the combustor 33 to the oxidant to be supplied to the regenerator 20. Heating the oxidant before introducing it into the regenerator 20 will limit the cooling down of the mediator solution in the regenerator 20, or may even warm up the mediator solution by virtue of the sensible heat of the oxidant. As a result, the regeneration of the mediator at the regenerator 20 is accelerated.

The structure of the heat exchanger 40 is not critical as long as the heat exchanger 40 is capable of heat exchange between the combustion exhaust and the oxidant. Examples of heat exchangers that can be used as the heat exchanger 40 include a shell-and-tube heat exchanger, a plate heat exchanger, a fin-and-tube heat exchanger, and a double-pipe heat exchanger. In certain configurations, the piping forming the oxidant feed path 24 may be in contact with that forming the gas exhaust path 35, whether directly or with another component therebetween, or the piping forming the oxidant feed path 24 may be positioned near that forming the gas exhaust path 35. Such cases can be understood as the formation of the heat exchanger 40 by the piping forming the oxidant feed path 24 and that forming the gas exhaust path 35.

The following describes some other embodiments. Any element in common with Embodiment 1 is referenced by the same designator as in Embodiment 1 without repeated description. Descriptions may be true across different embodiments unless technically contradictory. Different embodiments may be combined unless technically contradictory.

Embodiment 2

Figure 2:
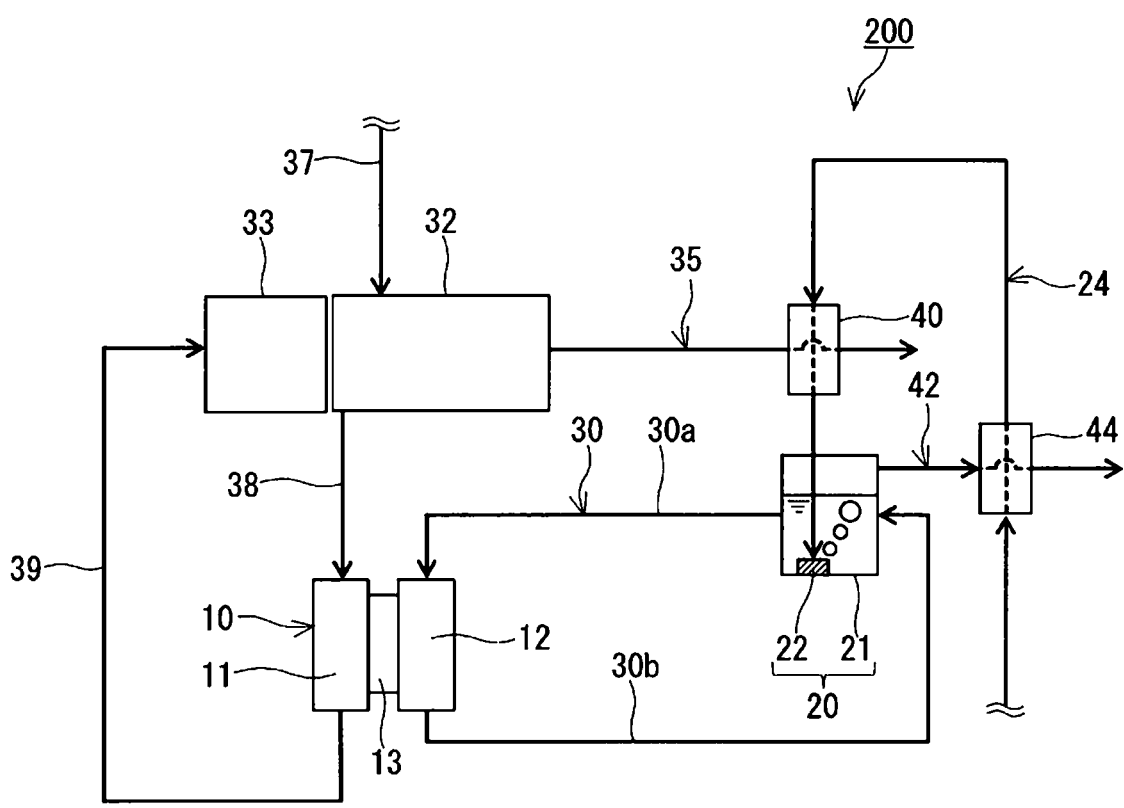
FIG. 2 illustrates the construction of a fuel cell system according to Embodiment 2 of the present disclosure.

FIG. 2 illustrates the construction of a fuel cell system according to Embodiment 2 of the present disclosure. The fuel cell system 200 further includes a gas discharge path 42 and a heat exchanger 44 (second heat exchanger) besides the elements of the fuel cell system 100 according to Embodiment 1.

The gas discharge path 42 is connected to the regenerator 20 in order to degas the regenerator 20. To be more specific, the gas discharge path 42 opens into the space inside the regenerator 20 at a position higher than the surface of the mediator solution. The gas discharged from the regenerator 20 can be, for example, air past the mediator solution or steam produced by the water resulting from the regeneration of the mediator.

The heat exchanger 44 is in the oxidant feed path 24. To be more specific, the heat exchanger 44 is in the oxidant feed path 24 and the gas discharge path 42. The heat exchanger 44 forms part of the oxidant feed path 24, and also forms part of the gas discharge path 42. The heat exchanger 44 exchanges heat between the gas discharged from the regenerator 20 and the oxidant to be supplied to the regenerator 20. The oxidant to be supplied to the regenerator 20 is heated by the gas discharged from the regenerator 20. If the gas discharge path 42 doubles as a discharge path for steam, the heat exchanger 44 may also give the sensible and latent heat of the steam to the oxidant to be supplied to the regenerator 20.

If the regeneration of the mediator is exothermic, the mediator solution and the gas discharged from the regenerator 20 are usually hotter than the external temperature. Heating the oxidant to be supplied to the regenerator 20 with the gas discharged from the regenerator 20 will ensure that the oxidant is supplied at a higher temperature to the regenerator 20. The mediator solution in the regenerator 20 is therefore maintained at a higher temperature, making the regeneration of the mediator at the regenerator 20 faster. By allowing the oxidant to collect heat from each of the combustion exhaust and the gas discharged from the regenerator 20, this embodiment will make the fuel cell system 200 even more efficient.

In this embodiment, the heat exchanger 44 is upstream of the heat exchanger 40 in the oxidant feed path 24. That is, in this embodiment, the oxidant to be supplied to the regenerator 20 is heated by the gas discharged from the regenerator 20 and then by the combustion exhaust discharged from the combustor 33. Heating the oxidant in the order according to this embodiment will ensure that the oxidant is supplied at a higher temperature to the regenerator 20.

The structure of the heat exchanger 44 is not critical either. A heat exchanger that can be used as the heat exchanger 40 can also be used as the heat exchanger 44, and a mechanism of heat exchange that can be selected for the heat exchanger 40 can also be selected for the heat exchanger 44.

Embodiment 3

Figure 3:
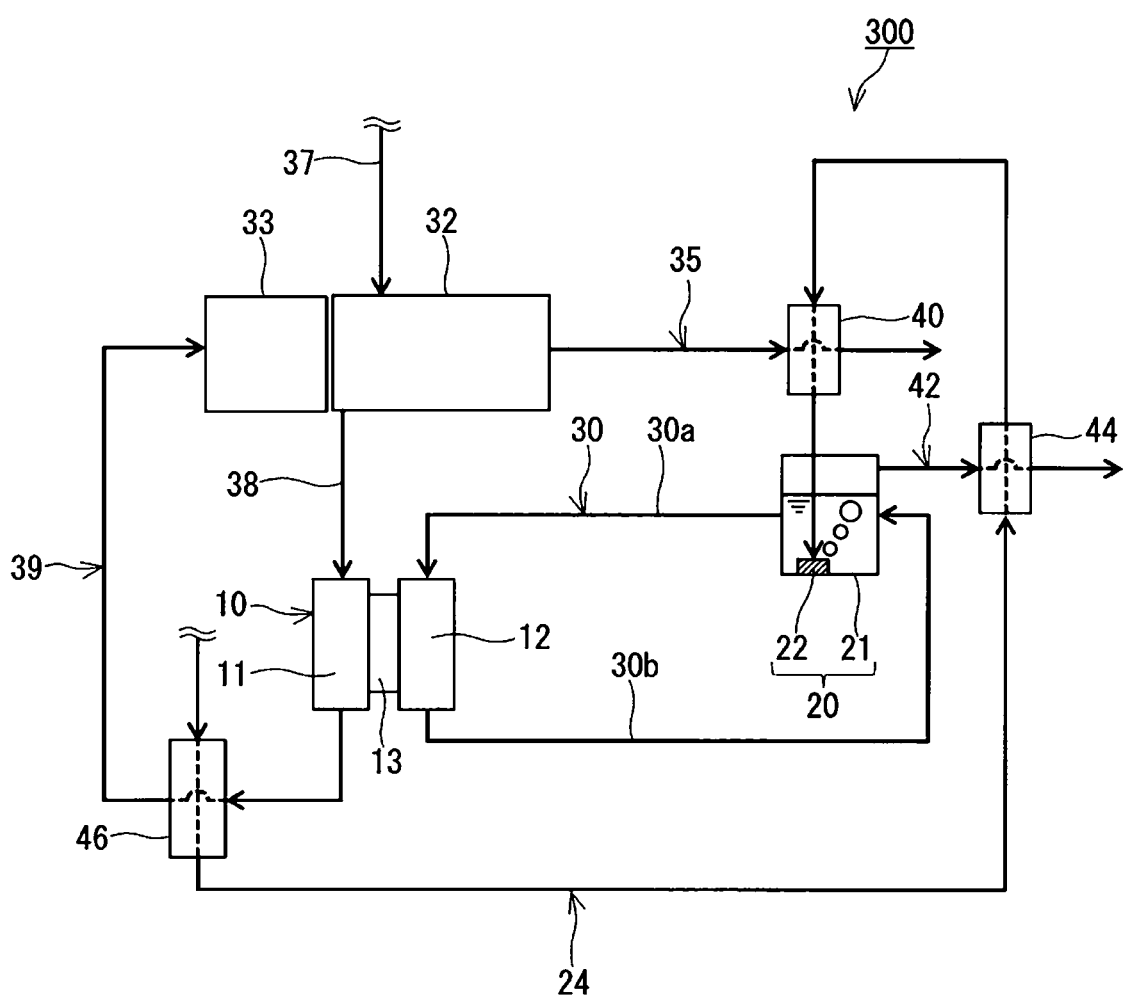
FIG. 3 illustrates the construction of a fuel cell system according to Embodiment 3 of the present disclosure.

FIG. 3 illustrates the construction of a fuel cell system according to Embodiment 3 of the present disclosure. The fuel cell system 300 further includes a heat exchanger 46 (third heat exchanger) besides the elements of the fuel cell system 200 according to Embodiment 2.

The heat exchanger 46 is in the oxidant feed path 24. To be more specific, the heat exchanger 46 is in the oxidant feed path 24 and the anode gas discharge path 39. The heat exchanger 46 forms part of the oxidant feed path 24, and also forms part of the anode gas discharge path 39. The heat exchanger 46 exchanges heat between the anode off-gas discharged from the anode 11 of the fuel cell 10 and the oxidant to be supplied to the regenerator 20. The oxidant to be supplied to the regenerator 20 is heated by the anode off-gas.

The anode off-gas discharged from the anode 11 is usually hotter than the external temperature. Heating the oxidant to be supplied to the regenerator 20 with the anode off-gas will ensure that the oxidant is supplied at a higher temperature to the regenerator 20. The mediator solution in the regenerator 20 is therefore maintained at a higher temperature, making the regeneration of the mediator at the regenerator 20 faster. By allowing the oxidant to collect heat from each of the combustion exhaust, the gas discharged from the regenerator 20, and the anode off-gas, this embodiment will make the fuel cell system 300 even more efficient.

In this embodiment, the heat exchanger 44 is upstream of the heat exchanger 40 in the oxidant feed path 24. The heat exchanger 46 is upstream of the heat exchanger 44 in the oxidant feed path 24. That is, in this embodiment, the oxidant to be supplied to the regenerator 20 is heated by the anode off-gas discharged from the anode 11, then by the gas discharged from the regenerator 20, and then by the combustion exhaust discharged from the combustor 33. Heating the oxidant in the order according to this embodiment will ensure that the oxidant is supplied at a higher temperature to the regenerator 20.

The structure of the heat exchanger 46 is not critical either. A heat exchanger that can be used as the heat exchanger 40 can also be used as the heat exchanger 46, and a mechanism of heat exchange that can be selected for the heat exchanger 40 can also be selected for the heat exchanger 46.

Embodiment 4

Figure 4:
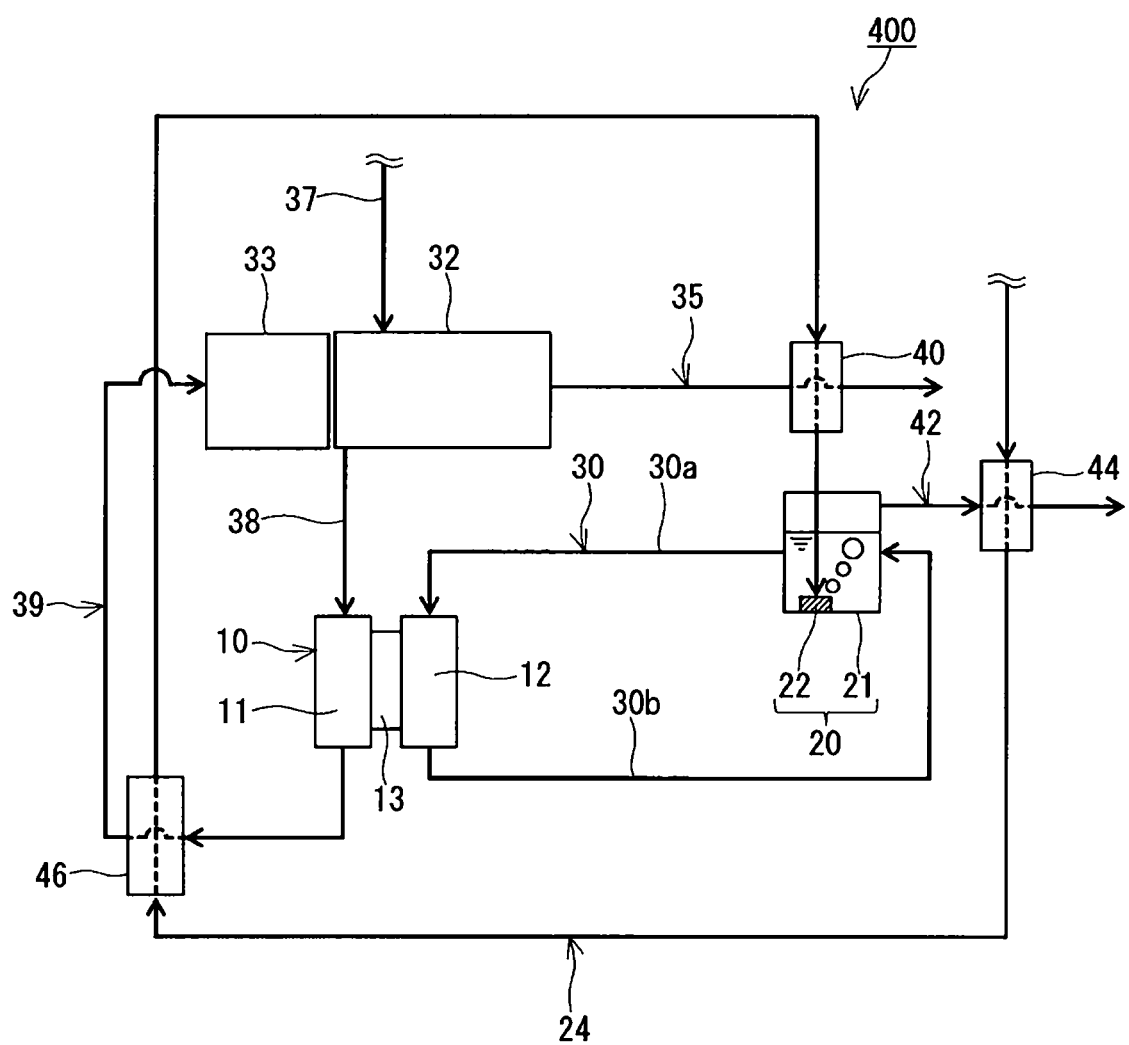
FIG. 4 illustrates the construction of a fuel cell system according to Embodiment 4 of the present disclosure.

FIG. 4 illustrates the construction of a fuel cell system according to Embodiment 4. The fuel cell system 400 is a variation of the fuel cell system 300 according to Embodiment 3.

In this embodiment, the heat exchanger 44 is upstream of the heat exchanger 40 in the oxidant feed path 24. The heat exchanger 46 is between the heat exchangers 40 and 44 in the oxidant feed path 24. That is, in this embodiment, the oxidant to be supplied to the regenerator 20 is heated by the gas discharged from the regenerator 20, then by the anode off-gas discharged from the anode 11 and then by the combustion exhaust discharged from the combustor 33. Heating the oxidant in the order according to this embodiment will ensure that the oxidant is supplied at a higher temperature to the regenerator 20.

Embodiment 5

Figure 5:
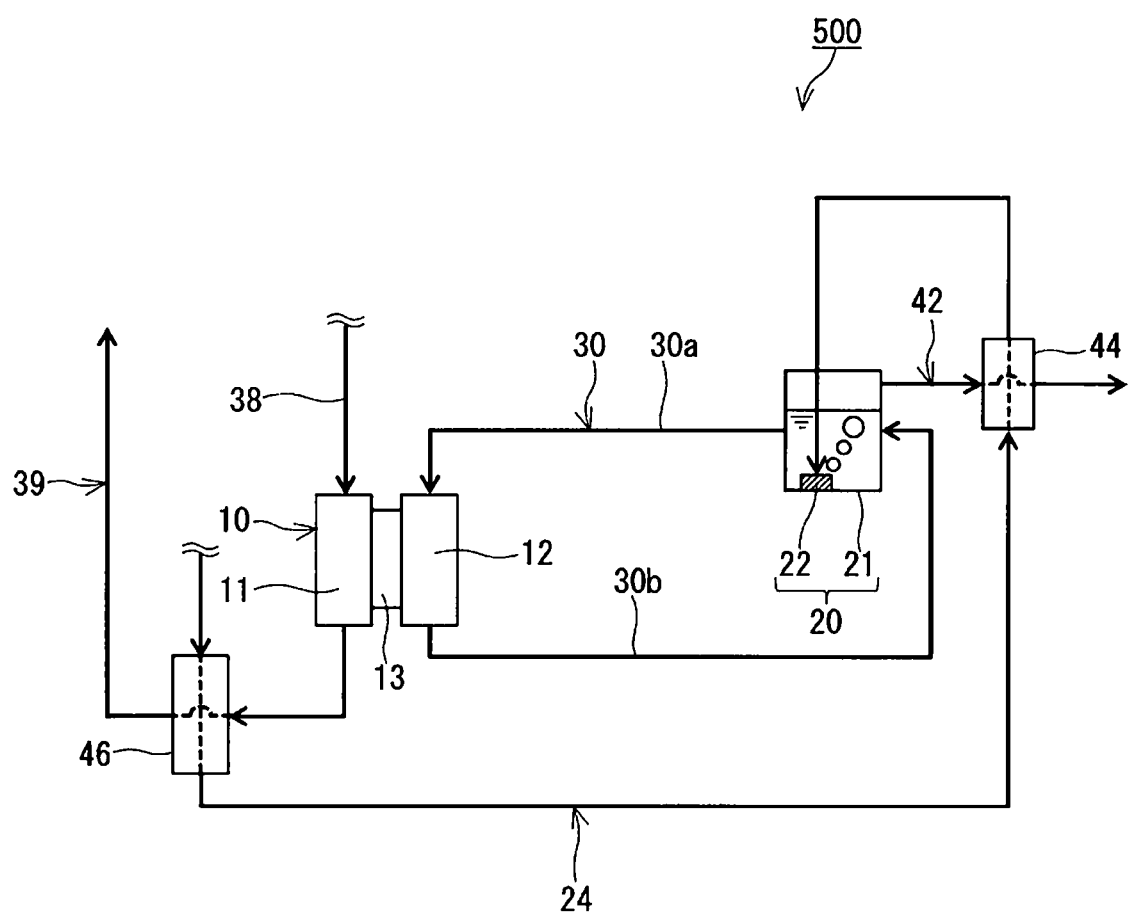
FIG. 5 illustrates the construction of a fuel cell system according to Embodiment 5 of the present disclosure.

FIG. 5 illustrates the construction of a fuel cell system according to Embodiment 5 of the present disclosure. The fuel cell system 500 includes no combustor and no reformer. The fuel cell system 500 is, for example, a hydrogen fuel cell system. The techniques disclosed herein can also be applied to hydrogen fuel cell systems. In the fuel cell system 500, the fuel gas feed path 38 is connected to a hydrogen storage tank, hydrogen-gas infrastructure, or any other source of hydrogen. Through the fuel gas feed path 38, hydrogen gas can be supplied to the anode 11.

In this embodiment, the oxidant is heated at each of the heat exchangers 44 and 46, and the heated oxidant is supplied to the regenerator 20. By allowing the oxidant to collect heat from each of the gas discharged from the regenerator 20 and the anode off-gas, this embodiment will make the fuel cell system 500 more efficient.

In this embodiment, the heat exchanger 46 is upstream of the heat exchanger 44 in the oxidant feed path 24. That is, in this embodiment, the oxidant to be supplied to the regenerator 20 is heated by the anode off-gas discharged from the anode 11 and then by the gas discharged from the regenerator 20. Heating the oxidant in the order according to this embodiment will ensure that the oxidant is supplied at a higher temperature to the regenerator 20.

The heat exchanger 46, however, may be downstream of the heat exchanger 44 in the oxidant feed path 24. The heat exchangers 44 and 46 can each be placed at their best positions, for example in accordance with the temperature of the anode off-gas and that of the gas discharged from the regenerator 20.

Other Variations

The fuel cell system 300 illustrated in FIG. 3 may exclude the heat exchanger 44 and have the heat exchangers 40 and 46 in the oxidant feed path 24. In this case, the oxidant to be supplied to the regenerator 20 is heated by the anode off-gas and the combustion exhaust.

The fuel cell system 300 illustrated in FIG. 3 may exclude the heat exchangers 40 and 46 and have the heat exchanger 44 may be in the oxidant feed path 24. In this case, the oxidant to be supplied to the regenerator 20 is heated by the gas discharged from the regenerator 20.

The fuel cell system 300 illustrated in FIG. 3 may exclude the heat exchangers 40 and 44 and have the heat exchanger 46 in the oxidant feed path 24. In this case, the oxidant to be supplied to the regenerator 20 is heated by the anode off-gas.

The fuel cell system 500 illustrated in FIG. 5 may have only one of the heat exchangers 44 and 46 in the oxidant feed path 24. For example, if the heat of the anode off-gas is used for a different purpose, such as heating water, the system 500 may exclude the heat exchanger 46 and have the heat exchanger 44 in the oxidant feed path 24.

That is, it may be that at least one selected from the group consisting of the heat exchangers 40, 44, and 46 is in the oxidant feed path 24.

INDUSTRIAL APPLICABILITY

The techniques disclosed herein are useful in fuel cell systems.

What is claimed is:

1. A fuel cell system comprising:
    a fuel cell that includes a cathode and an anode and generates electricity by reducing a mediator at the cathode;
    a regenerator that oxidizes, with an oxidant, the mediator reduced by the cathode;
    an oxidant feed path that is connected to the regenerator, wherein through the oxidant feed path, the oxidant to be supplied to the regenerator flows;
    a reformer;
    a combustor that heats the reformer;
    a first heat exchanger that exchanges heat between combustion exhaust discharged from the combustor and the oxidant to be supplied to the regenerator, and
    a second heat exchanger that exchanges heat between gas discharged from the regenerator and the oxidant to be supplied to the regenerator.

2. The fuel cell system according to claim 1, wherein the second heat exchanger is upstream of the first heat exchanger in the oxidant feed path.

3. The fuel cell system according to claim 1, further comprising a third heat exchanger that exchanges heat between anode off-gas discharge from the anode and the oxidant to be supplied to the regenerator.

4. The fuel cell system according to claim 3, wherein:
    the second heat exchanger is upstream of the first heat exchanger in the oxidant feed path, and
    the third heat exchanger is upstream of the second heat exchanger in the oxidant feed path.

5. The fuel cell system according to claim 3, wherein:
    the second heat exchanger is upstream of the first heat exchanger in the oxidant feed path; and
    the third heat exchanger is between the first and second heat exchangers in the oxidant feed path.

6. The fuel cell system according to claim 1, further comprising a circulation path that connects the fuel cell and the regenerator in such a manner that a solution containing the mediator circulates between the cathode of the fuel cell and the regenerator.

7. The fuel cell system according to claim 6, wherein the circulation path comprises a first path that connects a solution outlet of the regenerator to an input of the cathode so as to supply the mediator to the cathode, and a second path that connects an output of the cathode to a solution inlet of the regenerator so as to supply the mediator reduced by the cathode to the regenerator.

* * * * *